Patented Dec. 3, 1940

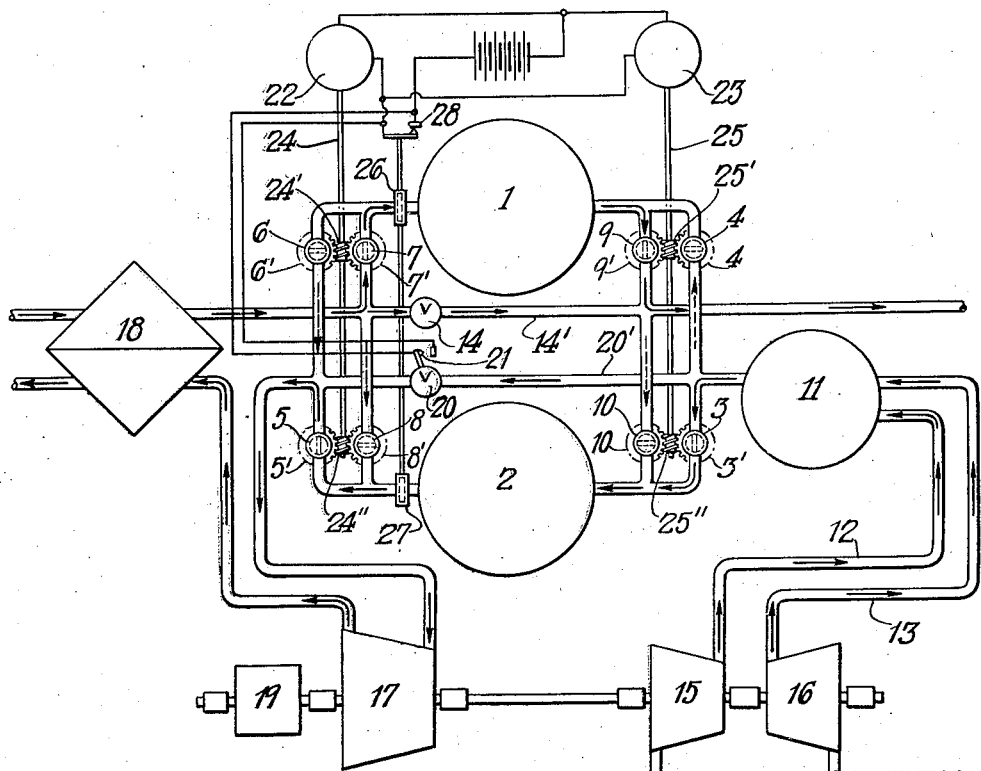

2,223,572

UNITED STATES PATENT OFFICE 2,223,572

HEAT PRODUCER AND EXCHANGER

Walter Gustav Noack, Baden, and Otto Zweifel, Zurich, Switzerland, assignors to Aktiengesellschaft Brown, Boveri & Cie., Baden, Switzerland Application March 11, 1939, Serial No. 261,164 In Germany March 12, 1938

4 Claims. (Cl. 263—19)

The present invention relates to a method and a plant for heating air or gas, more particularly to an air or gas heater of the regenerative type in which there is only one combustion chamber serving a plurality of alternately operated heat exchangers; this combustion chamber is operated at high pressure and the heating gases produced therein have a pressure which is considerably above atmospheric pressure. The present invention further relates to a combination of an air or gas heater of the regenerative type and an air or gas heater of the recuperative type whereby the former may be made of bricks or other high temperature resisting material and the latter of metal.

In heaters of the regenerative type at least two devices are needed which alternately absorb heat from heating gases and accumulate said heat and then discharge and transfer it to the air or gas to be heated. The heating gases are produced in a combustion chamber and blown over the bricks filling the heat exchanger by natural draft or a ventilator. As a rule each device has its own individual combustion chamber. When switching over from the charging to the discharging phase and vice versa not only the heat exchanger but also the combustion chamber is changed and the gas to be heated is passed through the combustion chamber which was fired just before the switching.

Particularly in air heaters for producing the hot air for blast furnaces it has been found advantageous to produce the heating gases at high pressure and blow them at high velocity and high pressure over the bricks in the heater. In this case the dimensions of the combustion chamber, the heater and conduits are greatly reduced because combustion is accelerated, heat transfer is improved and the areas through which the hot gases pass as well as the heating surfaces can be much reduced. The interior volume of the combustion chamber and all devices for switching the gas flow such as valves and dampers can be made smaller. If the pressure in the combustion chamber and flues is approximately the same as the pressure of the air or gas to be heated it is not necessary to wait till the content of the combustion chamber and gas passages has reached the pressure of the air or gas to be heated when switching over from charging to discharging operation or until the wind pressure is reduced to the atmospheric pressure of the combustion chamber; because of the little difference of pressure switching can take place without intermission and delay. It is then also possible to operate the combustion chamber continuously and to direct the heating gases alternately from the combustion chamber through the different parts of the regenerator.

Heat transmission and heat accumulating capacity are not the same over the entire extension of the gas passage; they diminish toward the end of the regenerator due to the diminishing differences of temperature. In the low temperature zones of the heat exchanger high heat resisting brick or other material is not required and it is also not necessary to use the regenerative principle in these zones. It is therefore proposed to use the regenerative principle in combination with the recuperative principle whereby the regenerator takes care of the first stages of heat transfer process and the recuperator of the later stages.

Further and other objects of the present invention will be hereinafter set forth in the accompanying specification and shown in the drawing which, by way of illustration, shows what we consider to be a preferred embodiment of our invention.

The one figure of the drawing shows a plant according to the present invention having a pressure fired combustion chamber 11. 1 and 2 designate heat exchangers and 3 to 10 switching devices. The combustion air is supplied through a conduit 12 and the fuel through conduit 13; air and fuel are brought up to comparatively high pressure by means of the blowers or pumps 15 and 16 which are operated by means of the gas turbine 17. The hot high pressure heating gases are used for operating turbine 17. Under almost all practical operating conditions a temperature of the gases of about 900° Fahrenheit and a pressure of at least ¾ of the compression pressure produced in compressors 15 and 16 is sufficient for operating turbine 17. In order to fully utilize the heat left in the heating and turbine operating gases after expansion in turbine 17 an air or gas preheater 18 may be provided in which the heating gases are cooled down to almost the temperature of the incoming air or gas to be heated. Preheater 18 operates according to the recuperative principle and may be made of metal because the temperatures at which it is operated are not very high; no arrangements for switching gases to be heated and heating gases are needed.

An auxiliary motor 19 is provided for starting, regulating and providing additional power at insufficient power supply of turbine 17. A conduit 14' is provided for the air or gas to be heated which by-passes heaters 1 and 2 and is equipped with a valve 14; by manipulation of valve 14 the temperature of the air or gas to be heated can be adjusted. Another conduit 20' for conducting heating gases also by-passes heaters 1 and 2 and contains a valve 20; the temperature of the air or gas to be heated and also of the gases operating turbine 17 can be adjusted by operating valve 20.

Valve 20 may be interlinked with the valves 3 to 10 for switching the heating gas and the air or gas to be heated so that this switching operation depends on the position of valve 20. For example, valve 20 when fully closed, which indicates that the gases coming from heater 2 are very hot and no further heating is required, may be made to close an electric contact 21 whereby electric motors 22 and 23 are set in operation which motors rotate rods 24 and 25 respectively. Rods 24 and 25 are provided with worms 24' and 24" and 25' and 25" respectively which cooperate with worm wheels 6', 7' and 5', 8' and 9', 4' and 10', 3' respectively of the valves 3 to 10. Motor 22 opens valves 6 and 8 and closes valves 5 and 7 and motor 23 opens valves 4 and 10 and closes valves 3 and 9 so that the heating gases are now directed through heat exchanger 1 and the air or gases to be heated through heat exchanger 2. The operator opens valve 20 because the gases emerging from heater 1 which must be heated are now too cold for operating the turbine 17. Upon the next closing of valve 20 motors 22 and 23 or shafts 24 and 25 rotate in the opposite direction and open valves 3, 5, 7 and 9 and close valves 4, 6, 8 and 10 so that heating gas and air to be heated are directed through the conduits marked with solid line arrows and heater 2 absorbs and accumulates heat whereas heater 1 releases heat. The arrangement for making motors 22 and 23 or shafts 24 and 25 to alternately rotate in opposite direction upon successive closing of valve 20 is not shown because such arrangements are well known and do not form part of the present invention.

Operation of valves 3 to 10 may alternately be made dependent on the temperature of the heating gas leaving the heaters 1 or 2. When the temperature of the heating gas reaches a predetermined value thermostats 26 or 27 close switch 28 and motors 22 and 23 are operated to change the position of valves 3 to 10 to switch the flow of the heating gases and of the gases to be heated from one heat exchanger to the other. Also in this case motors 22 and 23 alternately rotate in opposite direction upon successive closing of switch 28.

While we believe the above described embodiment of our invention to be a preferred embodiment, we wish it to be understood that we do not desire to be limited to the exact details of method, design and construction shown and described, for obvious modifications will occur to a person skilled in the art.

We claim:

1. The method of producing large quantities of highly heated gas or air comprising the step of producing high pressure combustion gases by burning combustion materials at high pressure in a combustion chamber, of alternately passing the high pressure gases at high velocity through heat exchangers of the regenerative type, of passing the gas or air to be heated through said heat exchangers, of producing power by means of said gases after they have passed through the heat exchangers, and of using said power for supplying the combustion gases at high pressure to said combustion chamber.

2. The method of producing large quantities of highly heated gas or air comprising the step of producing high pressure combustion gases by burning combustion materials at high pressure in a combustion chamber, of alternately passing the high pressure gases at high velocity through heat exchangers of the regenerative type, of passing the gas or air to be heated through said heat exchangers, of producing power by means of said gases after they have passed through the heat exchangers, using said power for supplying the combustion gases at high pressure to said combustion chamber, of passing the gases after they have produced power through a heat exchanger of the recuperative type, and of passing the gas or air to be heated through said last mentioned heat exchanger prior to passing them through said first mentioned heat exchangers.

3. A heating plant for producing highly heated gas or air comprising a high pressure combustion chamber producing high pressure combustion gases, a regenerative heat exchanger having a plurality of individual heat accumulating and discharging chambers through which the gas or air to be heated is alternatively blown, said chambers being alternately connected for gas flow with said combustion chamber, a gas turbine receiving operating gas from said heat exchanger, and a compressor connected to and being operated by said turbine and supplying high pressure combustion material to said combustion chamber.

4. A heating plant for producing highly heated gas or air comprising a high pressure combustion chamber producing high pressure combustion gases, a regenerative heat exchanger having a plurality of individual heat accumulating and discharging chambers through which the gas or air to be heated is alternatively blown, said chambers being alternately connected for gas flow with said combustion chamber, a gas turbine receiving operating gas from said heat exchanger, a compressor connected to and being operated by said turbine and supplying high pressure combustion material to said combustion chamber, and a heat exchanger of the recuperative type through which exchanger the gas or air to be heated is passed before being blown into said chambers, said second mentioned heat exchanger being connected to and receiving heating gas from said turbine.

WALTER GUSTAV NOACK.
OTTO ZWEIFEL.